(12) United States Patent
Hong et al.

(10) Patent No.: US 9,243,689 B2
(45) Date of Patent: Jan. 26, 2016

(54) TRANSMISSION DEVICE FOR AUTOMATIC DOCUMENT FEEDER

(71) Applicant: Foxlink Image Technology Co., Ltd., New Taipei (TW)

(72) Inventors: I Chuan Hong, New Taipei (TW); Lung Chen, New Taipei (TW); Tsung Ching Chou, New Taipei (TW); Ting Yu Lu, New Taipei (TW); Jing Hua Fang, New Taipei (TW); Wen Ching Liao, New Taipei (TW)

(73) Assignee: FOXLINK IMAGE TECHNOLOGY CO., LTD., New Taipei (TW)

( * ) Notice: Subject to any disclaimer, the term of this patent is extended or adjusted under 35 U.S.C. 154(b) by 418 days.

(21) Appl. No.: 13/838,588

(22) Filed: Mar. 15, 2013

(65) Prior Publication Data

US 2014/0260739 A1 Sep. 18, 2014

(51) Int. Cl.
*H04N 1/04* (2006.01)
*F16H 3/34* (2006.01)
*H04N 1/00* (2006.01)
*B65H 85/00* (2006.01)
*H04N 1/12* (2006.01)
*H04N 1/193* (2006.01)

(52) U.S. Cl.
CPC .............. *F16H 3/34* (2013.01); *B65H 85/00* (2013.01); *H04N 1/0058* (2013.01); *H04N 1/00578* (2013.01); *H04N 1/00602* (2013.01); *H04N 1/00649* (2013.01); *B65H 2403/422* (2013.01); *B65H 2801/39* (2013.01); *H04N 1/12* (2013.01); *H04N 1/193* (2013.01); *H04N 2201/0081* (2013.01); *Y10T 74/19367* (2015.01)

(58) Field of Classification Search
CPC ..... F16H 3/34; H04N 1/00578; H04N 1/0058
USPC ................ 358/496, 498, 497, 474, 505, 471; 318/685, 696
See application file for complete search history.

(56) References Cited

U.S. PATENT DOCUMENTS

| | | | | |
|---|---|---|---|---|
| 4,866,531 A * | 9/1989 | Kobori et al. | ................. | 358/400 |
| 5,206,737 A * | 4/1993 | Sugiyama | ..................... | 358/296 |
| 5,226,639 A * | 7/1993 | Kida et al. | ..................... | 271/109 |
| 5,854,696 A * | 12/1998 | Yun | ................................ | 358/498 |
| 5,862,446 A * | 1/1999 | Hashizume et al. | .......... | 399/367 |
| 6,019,363 A * | 2/2000 | Ahn | ............................ | 271/10.05 |
| 6,948,871 B1 * | 9/2005 | Onishi et al. | .................. | 400/679 |
| 7,123,386 B2 * | 10/2006 | Tanaka et al. | ................. | 358/474 |
| 7,448,620 B2 * | 11/2008 | Ha | ............................ | 271/258.01 |

(Continued)

*Primary Examiner* — Cheukfan Lee
(74) *Attorney, Agent, or Firm* — WPAT, P.C.; Anthony King (57) ABSTRACT

A transmission device for an automatic document feeder includes a driving gear set driven by a driving motor, a first swing arm equipped with a first driving roller set, a second swing arm equipped with a second driving roller set, and a one-way gear set driven by the driving gear set to keep transmitting rollers rotating in the same direction. The first swing arm is driven by the driving gear set and swingable between a first position and a second position to mesh the first driving roller set with a pickup device or an output device. The second swing arm is driven by the driving gear set and swingable between a third position and a fourth position to mesh the second driving roller set with the pickup device or the output device. When the first swing arm swings toward the first position, the second arm swings toward the fourth position, and when the first swing arm swings toward the second position, the second swing arm swings to the third position.

9 Claims, 12 Drawing Sheets

(56) References Cited

U.S. PATENT DOCUMENTS

| | | | |
|---|---|---|---|
| 7,466,461 B2* | 12/2008 | Chen et al. | 358/474 |
| 7,729,020 B2* | 6/2010 | Chien | 358/497 |
| 7,869,105 B2* | 1/2011 | Ikeda | 358/498 |
| 7,984,907 B2* | 7/2011 | Chen | 271/273 |
| 8,328,179 B2* | 12/2012 | Shimomura et al. | 271/4.04 |
| 8,730,532 B2* | 5/2014 | Lee | 358/474 |
| 8,848,264 B2* | 9/2014 | Mori | 358/498 |
| 2013/0329265 A1* | 12/2013 | Miyamoto | 358/496 |
| 2014/0092446 A1* | 4/2014 | Shingai | 358/496 |

* cited by examiner (Prior Art)
FIG. 1

TRANSMISSION DEVICE FOR AUTOMATIC DOCUMENT FEEDER

BACKGROUND OF THE INVENTION

1. Field of the Invention

The present invention relates to a power transmission device, especially to a transmission device used in an automatic document feeder.

2. The Related Art

Figure 1:
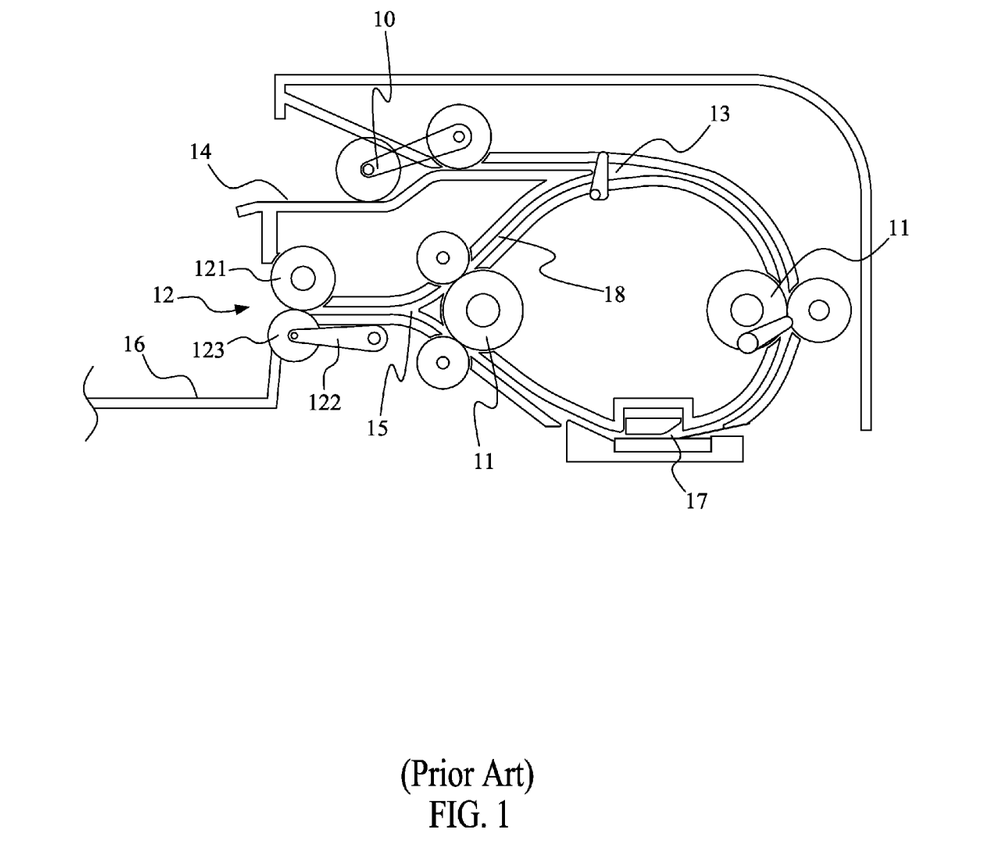
FIG. 1 shows a cross-sectional view of a conventional automatic document feeder.

Referring to FIG. 1, it shows a schematic diagram of a conventional automatic document feeder. The automatic document feeder defines a paper transmitting path that is consisted of an input tray 14, an input path 13, a scanning area 17, an output path 15, and an output tray 16 in sequence from upstream to downstream. A reverse path 18 is connected between the input path 13 and the output path 15.

In order to convey documents through the paper transmitting path, a plurality of transmission devices are placed along the paper transmitting path. For example, a pickup device 10 is provided at the inlet end of the input path 13, a plurality of transmitting rollers 11 are provided along the input path 13 and the output path 15, and an output device 12 is provided at the outlet end of the output path 15.

When the documents need to be scanned by the automatic document feeder, the pickup device 10 will descend for transmitting one of the documents into the input path 13. After the document enters the input path 13 and reaches the transmitting roller 11, the pickup device 10 will rise to avoid multiple feeding.

Next, the transmitting rollers 11 disposed along the input path 13 and the output path 15 rotate to transmit the document into the scanning area 17 for being scanned, and further transmit the scanned document to the output tray 16.

The output device 12 placed at the outlet end of the output path 15 is provided with a driving roller 121 and a movable idle roller 123. The idle roller 123 keeps contact with the driving roller 121 to apply normal force to the documents in the process of single-side scanning. But in the process of double-side scanning, the output device 12 will reverse and transmit the document finished its first-side scanning into the reverse path 18. Then the document passes through the reverse path 18 to return into the input path 13 and face a scanning device of the scanning area 17 with the second side thereof. In order to avoid document jam by the output device 12 in the process of double-side scanning, the idle roller 123 will swing down to separate from the driving roller 121.

It is known that the pickup device 10, the transmitting rollers 11 and the output device 12 have great difference about their actuation timing and rotation direction. The transmitting rollers 11 basically keeps rotating in the same direction, the pickup device 10 and the output device 12 will change their rotate directions according to the location of the documents, and the driving rollers 121 and the idle roller 123 of the output device 12 will need to separate from each other in the process of double-side scanning. Therefore, most of conventional automatic document feeders would use at least two motors or a clutch with a solenoid to operate the pickup device 10, the transmitting rollers 11 and the output device 12 respectively. As a result, the conventional automatic document feeder has higher manufacture cost and is harder to be miniaturized.

To solve the above disadvantages, the transmission device used in the conventional automatic document feeder is necessary to be improved.

SUMMARY OF THE INVENTION

An objective of the present invention is to provide a transmission device for an automatic document feeder. The automatic document feeder defines a paper transmitting path. A pickup device, transmitting rollers and an output device are disposed along the paper transmitting path. The transmission device is disposed among the pickup device, the transmitting rollers and the output device for transmitting the driving torque of a driving motor which is located in the automatic document feeder.

The transmission device includes a driving gear set driven by the driving motor and disposed between the pickup device and the output device, a first swing arm driven by the driving gear set and equipped with a first driving roller set, a second swing arm driven by the driving gear set and equipped with a second driving roller set, and a one-way gear set driven by the driving gear set for applying the driving torque in a constant direction to the transmitting rollers regardless of the rotating direction of the driving gear set. The first swing arm is swingable according to the rotating direction of the driving gear set between a first position meshing the first driving roller set with the pickup device to apply the driving torque to the pickup device, and a second position meshing the first driving roller set with the output device to apply the driving torque to the output device. The second swing arm is swingable according to the rotating direction of the driving gear set between a third position meshing the second driving roller set with the pickup device to apply the driving torque to the pickup device, and a fourth position meshing the second driving roller set with the output device to apply the driving torque to the output device. When the first swing arm swings toward the first position, the second arm swings toward the fourth position, and when the first swing arm swings toward the second position, the second swing arm swings toward the third position.

In summary, the transmission device in this invention is characterized by using a plurality of swing arms which are driven by the same driving gear set but swing in different directions to transmit the driving torque from the driving gear set to the pickup device, the output device and the transmitting rollers. And it further utilizes the time difference caused by the swinging of the swing arms to control the output time of the driving torque. Therefore, when the automatic document feeder uses the transmission device of the present invention therein, it only need use a single driving motor without any other additional electronic controllers in the automatic document feeder, so that effectively reduces the volume and the production cost of the automatic document feeder.

BRIEF DESCRIPTION OF THE DRAWINGS

The present invention will be apparent to those skilled in the art by reading the following description, with reference to the attached drawings, in which:

FIGS. 8A~11 show the working process of the automatic document feeder using the transmission device of FIG. 2.

DETAILED DESCRIPTION OF THE PREFERRED EMBODIMENT

Figure 2:
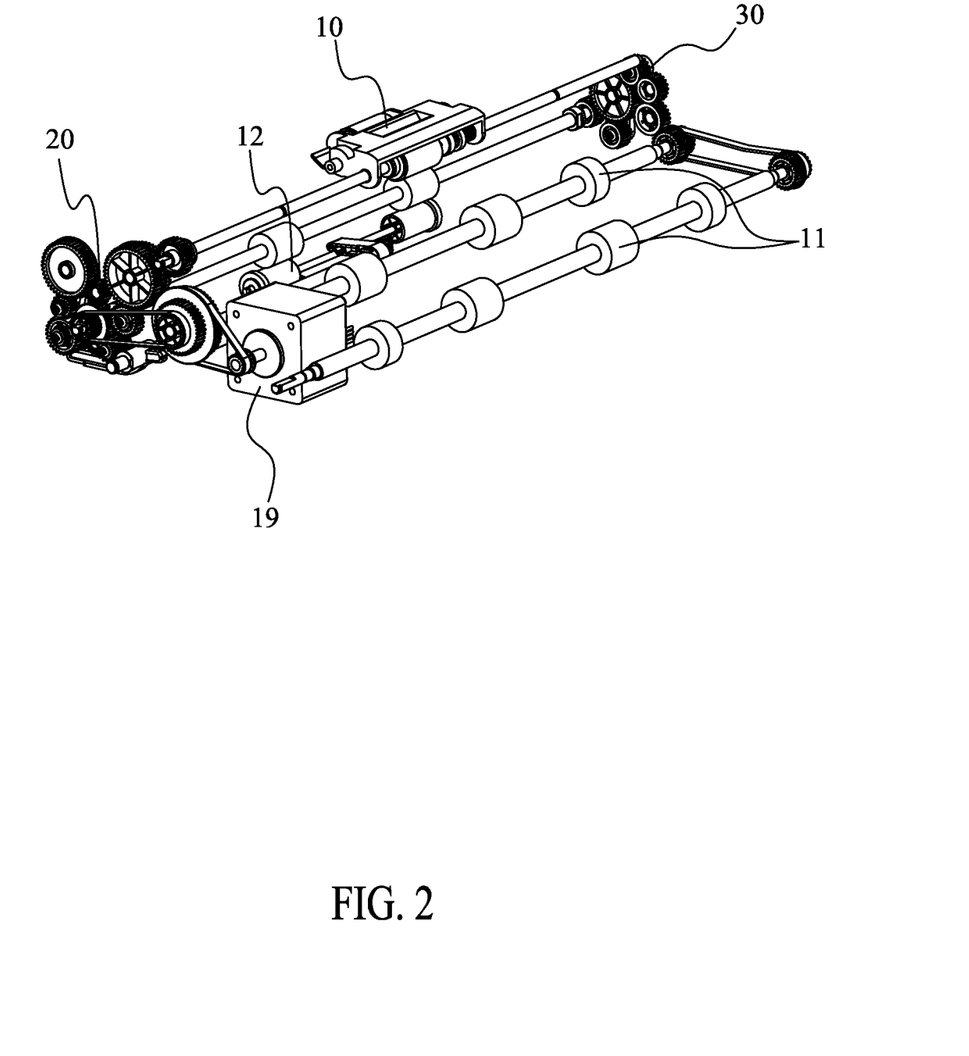
FIG. 2 is a perspective view showing that a transmission device according to an embodiment of the present invention is disposed among a pickup device, transmitting rollers and an output device of an automatic document feeder.
Figure 3:
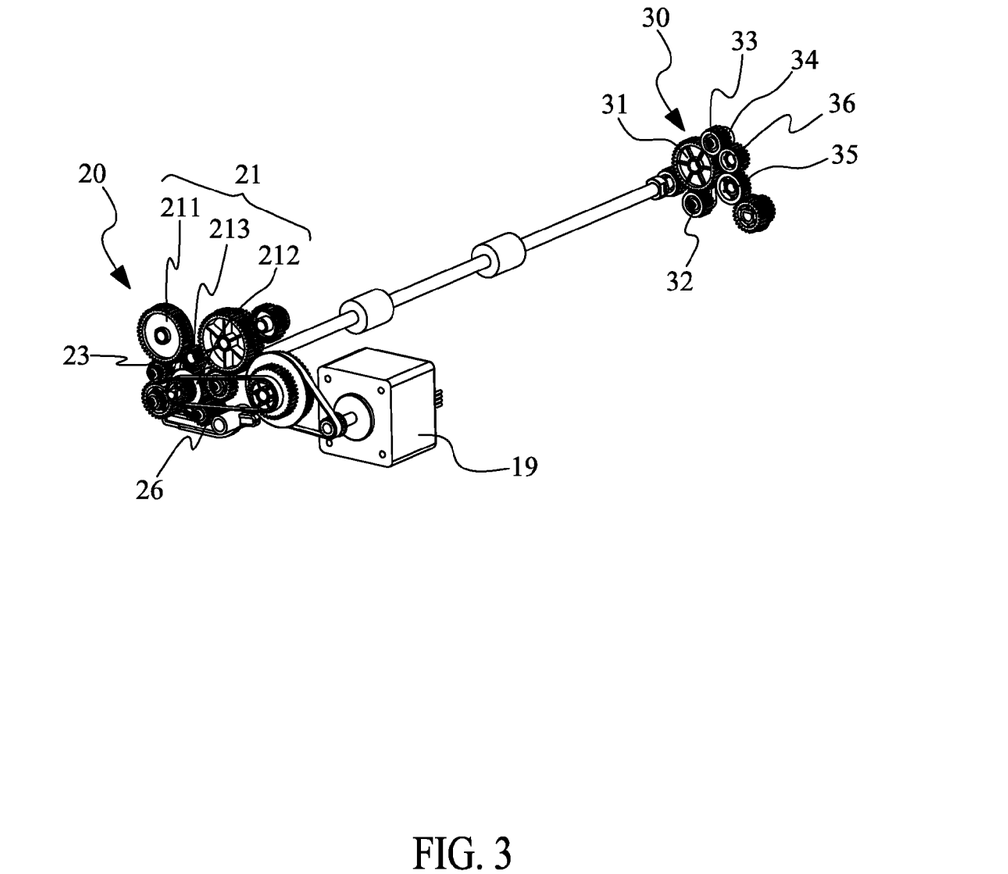
FIG. 3 shows a perspective view of the transmission device in this invention.
Figure 4A:
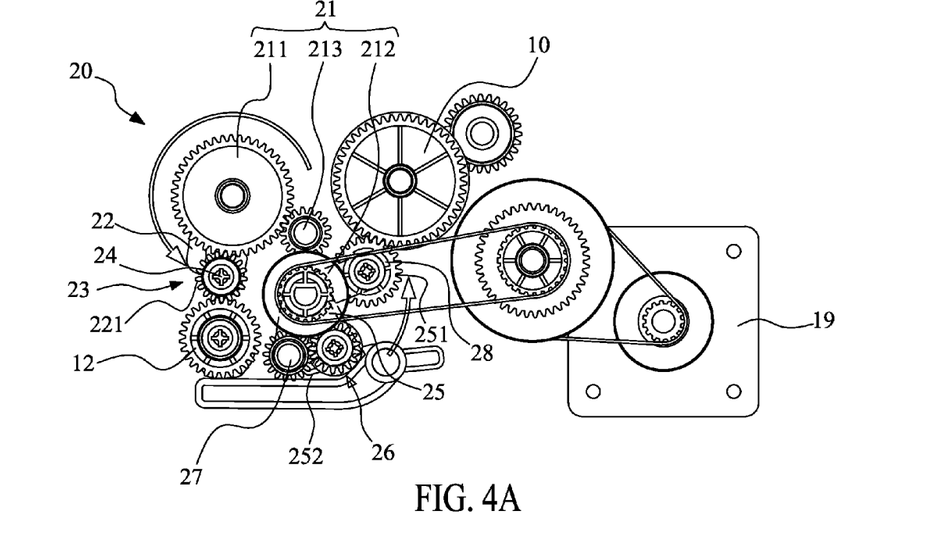
FIG. 4A is a schematic diagram showing that when a first swing arm of the transmission device swings to a second position, a second swing arm swings to a third position.
Figure 4B:
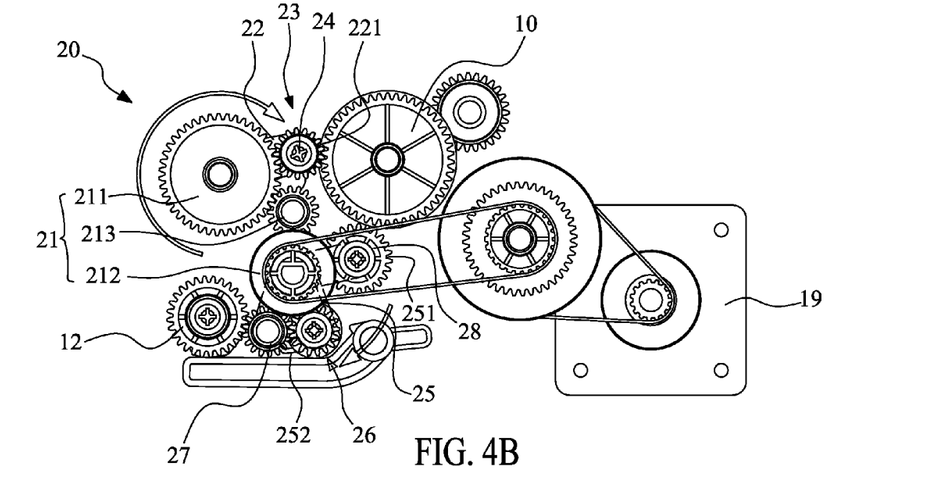
FIG. 4B is a schematic diagram showing that when the first swing arm swings to a first position, the second swing arm swings to a fourth position.

Referring to FIG. 2 to FIG. 4, a transmission device 20 according to the present invention is used for an automatic document feeder which defines a paper transmitting path (not labeled). A pickup device 10, transmitting rollers 11 and an output device 12 are disposed along the paper transmitting path. The transmission device 20 is disposed among the pickup device 10, the transmitting rollers 11 and the output device 12 for transmitting the driving torque of a driving motor 19 which is located in the automatic document feeder. The transmission device 20 includes a driving gear set 21, a first swing arm 22, a second swing arm 25 and a one-way gear set 30.

The driving gear set 21 is driven by the driving motor 19 and disposed between the pickup device 10 and the output device 12. The driving gear set 21 in this embodiment includes a first driving gear 211 driven by the driving motor 19, a reverse gear 213 meshed with the first driving gear 211, and a second driving gear 212 meshed with the reverse gear 213. The first driving gear 211 is connected with the second driving gear 212 by means of the reverse gear 213, so that the first driving gear 211 and the second driving gear 212 always rotate in the same direction.

The first swing arm 22 is driven by the driving gear set 21 and equipped with a first driving roller set 23. The first swing arm 22 is swingable according to the rotating direction of the driving gear set 21 between a first position meshing the first driving roller set 23 with the pickup device 10 to apply the driving torque to the pickup device 10, and a second position meshing the first driving roller set 23 with the output device 12 to apply the driving torque to the output device 12. The first swing arm 22 is coaxially hinged with and driven by the first driving gear 211, and the first driving roller set 23 is hinged on the free end 221 of the first swing arm 22. The first driving roller set 23 includes a first actuating gear 24 and a first torque limiter (not shown). The first actuating gear 24 is meshed with the first driving gear 211 and hinged on the first swing arm 22 by means of the first torque limiter.

The first torque limiter has a maximum limit of transmitting torque. If the torque transmitted between the first actuating gear 24 and the first swing arm 22 doesn't exceed the maximum limit of transmitting torque, there is no relative rotation between the first actuating gear 24 and the first swing arm 22. In that case, when the first driving gear 211 rotates, the first swing arm 22 will swing between the first position (shown in FIG. 4A) and the second position (shown in FIG. 4B) by the drive of the first driving gear 211. When the first swing arm 22 swings to the first position, the first driving roller set 23 is in contact with the pickup device 10, and when the first swing arm 22 swings to the second position, the first driving roller set 23 is in contact with the output device 12. And when the first driving roller set 23 is in contact with the pickup device 10 or the output device 12 and stops swinging, the first actuating gear 24 starts to rotate relatively with the first swing arm 22 and transmits the driving torque to the pickup device 10 or to the output device 12 by means of the first driving roller set 23.

The second swing arm 25 is driven by the driving gear set 21 and equipped with a second driving roller set 26. The second swing arm 25 is swingable according to the rotating direction of the driving gear set 21 between a third position meshing the second driving roller set 26 with the pickup device 10 to apply the driving torque to the pickup device 10, and a fourth position meshing the second driving roller set 26 with the output device 12 to apply the driving torque to the output device 12. The second swing arm 25 is coaxially hinged with and driven by the second driving gear 212, and has a first free end 251 and a second free end 252. The second driving roller set 26 in this embodiment is hinged on the second swing arm 25 and includes a second actuating gear 28, a second torque limiter (not shown) and a first reverse gear set 27. The second actuating gear 28 meshes with the second driving gear 212 and is hinged on the first free end 251 by means of the second torque limiter. The first reverse gear set 27 is hinged on the second free end 252 and meshed with the driving gear set 21. When the second swing arm 25 swings to the third position, the second actuating gear 28 is meshed with the pickup device 10 and transmits the driving torque to the pickup device 10 for driving the pickup device 10 to raise. When the second swing arm 25 swings to the fourth position, the first reverse gear set 27 is meshed with the output device 12 and transmits the driving torque to the output device 12.

The second torque limiter also has a maximum limit of transmitting torque, so when the second driving gear 212 rotates, the second swing arm 25 will swing between the third position (shown in FIG. 4A) and the fourth position (shown in FIG. 4B) according to the rotate direction of the second driving gear 212. When the second driving roller set 26 or the first reverse gear set 27 is in contact with the pickup device 10 or the output device 12 and force the second swing arm 25 to stop swinging, the second driving roller set 26 starts to transmit the driving torque to the pickup device 10 or the output device 12.

And wherein, when the first swing arm 22 swings toward the first position, the second arm 25 swings toward the fourth position (as shown in FIG. 4B), and when the first swing arm 22 swings toward the second position, the second swing arm 25 swings toward the third position (as shown in FIG. 4A).

Figure 5:
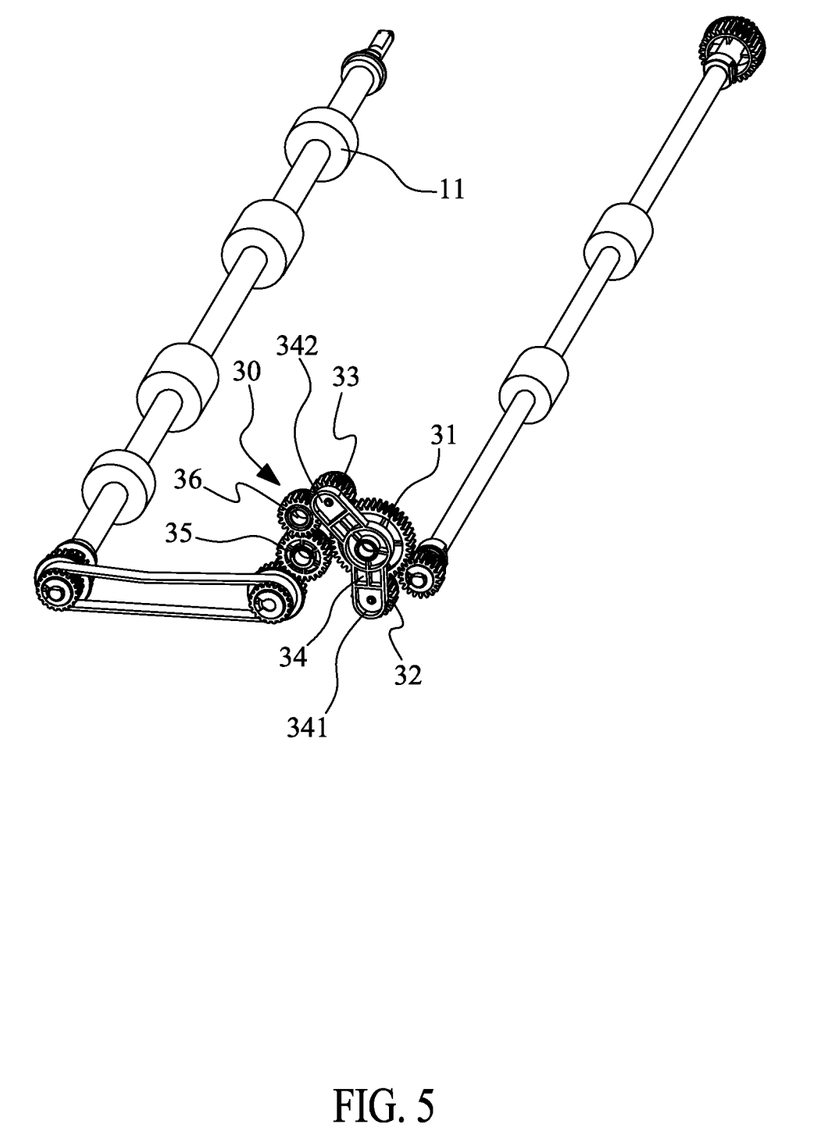
FIG. 5 shows a perspective view of a one-way gear set of the transmission device of FIG. 3 and the transmitting rollers of FIG. 2.
Figure 6A:
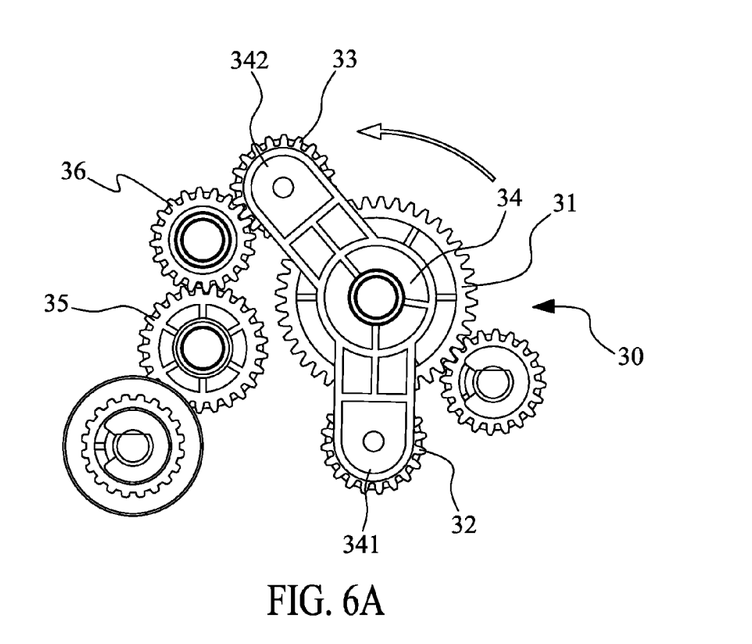
FIG. 6A shows a schematic diagram of a third swing arm of the transmission device swinging to a sixth position.
Figure 6B:
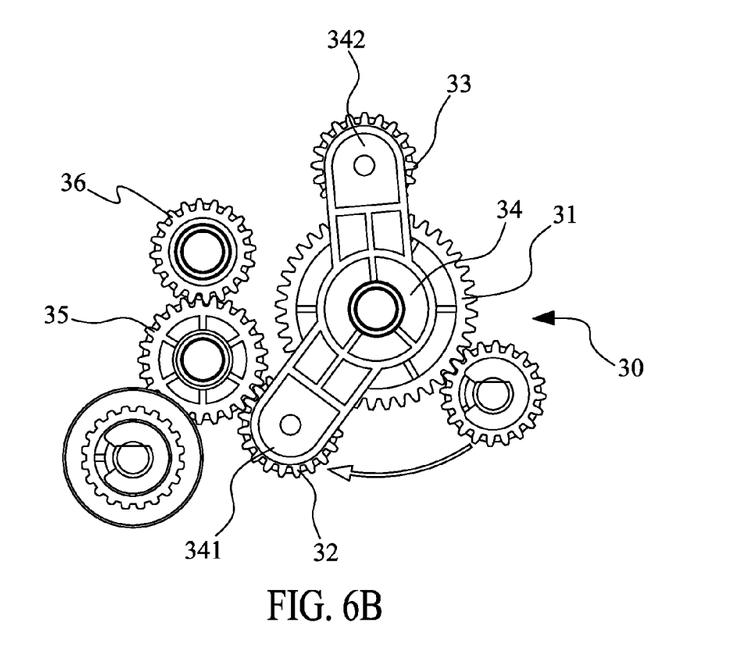
FIG. 6B shows a schematic diagram of the third swing arm swinging to a fifth position.

Referring to FIG. 5 and FIG. 6, the one-way gear set 30 is driven by the driving gear set 21 for applying the driving torque in a constant direction to the transmitting rollers 11 regardless of the rotating direction of the driving gear set 21. The one-way gear set 30 in this embodiment includes a third driving gear 31, a third swing arm 34 hinged with the third driving gear 31, a third actuating gear 32 and a fourth actuating gear 33 pivotally connected on the third swing arm 34, an output gear 35 meshed with the transmitting roller 11, and a second reverse gear set 36 meshed with the output gear 35. The third swing arm 34 is coaxially connected with the third driving gear 31 and has a third free end 341 and a fourth free end 342. The third actuating gear 32 and the fourth actuating gear 33 are both meshed with the third driving gear 31 and respectively hinged on the third free end 341 and the fourth free end 342 by means of a third and fourth torque limiters (not shown). The third swing arm 34 is swingable between a fifth position (as shown in FIG. 6B) meshing the third driving gear 31 with the output gear 35 by means of the third actuating gear 32 to apply the driving torque to the transmitting roller 11, and a sixth position (as shown in FIG. 6A) meshing the third driving gear 31 with the output gear 35 by means of the fourth actuating gear 33 and the second reverse gear set 36 to apply the driving torque to the transmitting roller 11, so that make the one-way gear set 30 apply the driving torque in a constant direction to the transmitting rollers 11 regardless of the rotation direction of the driving gear set 21 and keep the transmitting rollers 11 rotating in the same direction.

Figure 7A:
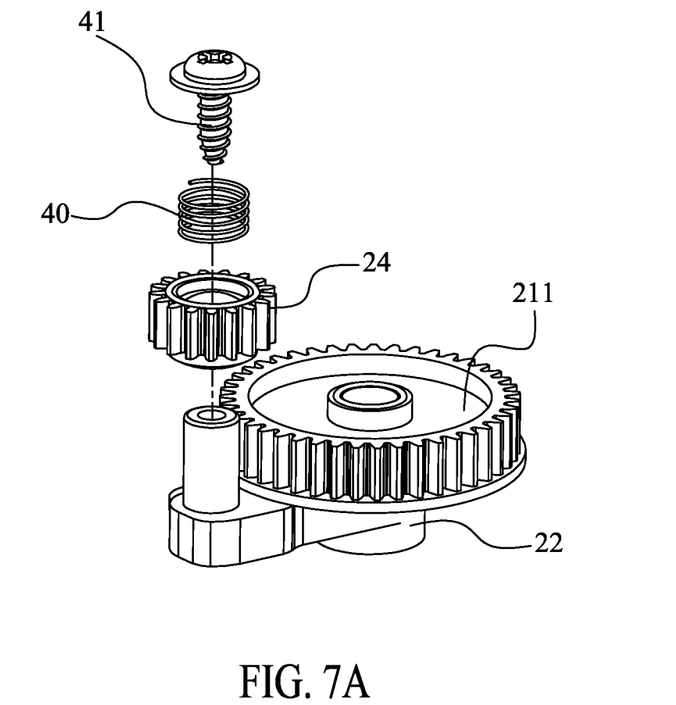
FIG. 7A shows an exploded diagram of a first torque limiter of the transmission device.
Figure 7B:
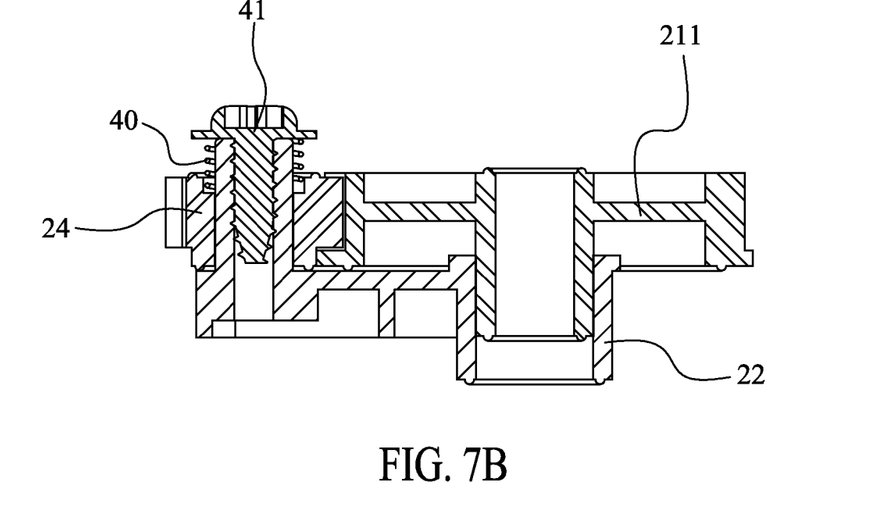
FIG. 7B shows a cross-sectional view of the first torque limiter.

The first to the fourth torque limiters in this embodiment are compression springs 40. The compression spring 40 is pivotally connected on each of the swing arms 22, 25, 34 and two ends of the compression spring 40 respectively abut against the actuating gears 24, 28, 32, 33 and the corresponding swing arms 22, 25, 34 to increase the normal force and friction between the swing arms 22, 25, 34 and the corresponding actuating gears 24, 28, 32, 33. Referring to FIG. 7A and FIG. 7B, taking the first torque limiter between the first swing arm 22 and the first actuating gear 24 for an example, the first actuating gear 24 and the compression spring 40 are coaxially hinged to the free end of the first swing arm 22, and the compression spring 40 is fixed by a screw bolt 41 to apply a normal force to the first actuating gear 24. Therefore, when the driving torque applied to the first swing arm 22 and the first actuating gear 24 is smaller than the resist of friction, the first swing arm 22 keeps relatively static to the first actuating gear 24. Until the driving torque exceeds the maximum friction resist between the first swing arm 22 and the first actuating gear 24, the first swing arm 22 starts to rotate relatively to the first actuating gear 24.

Figure 12:
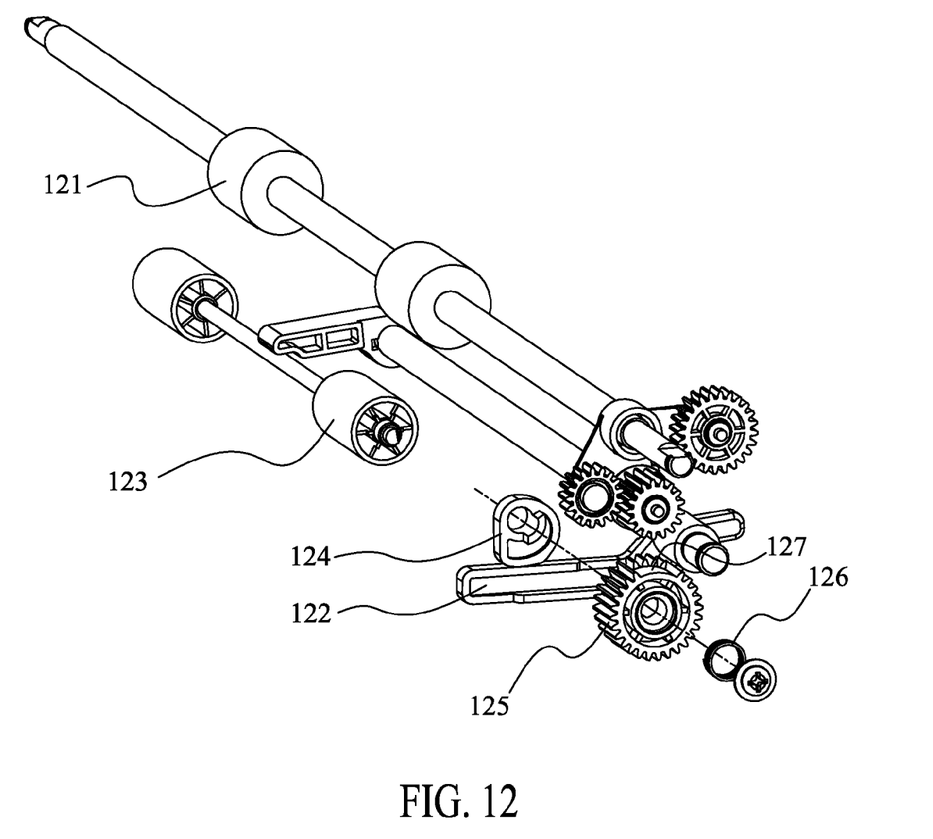
FIG. 12 shows an exploded diagram of the output device of FIG. 2.

Referring to FIG. 12, the output device 12 in this embodiment includes a driving roller 121, an idle roller swing arm 122 disposed opposite to the driving roller 121, a cam 124 disposed on one side of the idle roller swing arm 122, a missing tooth gear 125 with a missing-tooth portion 127 coaxially hinged with the cam 124, and an idle roller 123 hinged with and controlled by the idle roller swing arm 122. When the first swing arm 22 swings to the second position, the first driving roller set 23 is meshed with the missing tooth gear 125 to drive the output device 12. When the second swing arm 25 swings to the fourth position, the second driving roller set 26 is meshed with the missing tooth gear 125 to drive the output device 12 for making the idle roller 123 separate from the driving roller 121. When the missing tooth gear 125 rotates with the meshed driving roller sets 23, 26, the cam 124 rotates with the missing tooth gear 125 and enforces the idle roller swing arm 122 to swing till the missing-tooth portion 127 contacts with the meshed driving roller sets 23, 26.

Therefore, when the second swing arm 25 swings to the fourth position (as shown in FIG. 4B), the first reverse gear set 27 is meshed with the missing tooth gear 125 and make the missing tooth gear 125 rotate clockwise so as to further drive the cam 124 to rotate by 90 degrees until the missing tooth gear 125 gets to the missing-tooth portion 128. In the process of the cam 124 rotating, it further pushes the idle roller swing arm 122 to make the idle roller 123 approach the driving roller 121. When the missing tooth gear 125 gets to the missing-tooth portion 128, the first reverse gear set 27 still keeps rotating but the rotation thereof can't drive the missing tooth gear 125 anymore, at this time, the idle roller 123 is completely contacted with the driving roller 121.

In opposite, when the first swing arm 22 swings to the second position (as shown in FIG. 4A), the first driving roller set 23 is meshed with the missing tooth gear 125 and make the missing tooth gear 125 rotate clockwise so as to further drive the cam 124 to rotate by 270 degrees until the missing tooth gear 125 gets to another missing-tooth portion 128. In the process of the cam 124 rotating, it further pushes the idle roller swing arm 122 to make the idle roller 123 separate from the driving roller 121. When the missing tooth gear 125 gets to the missing-tooth portion 128, the first driving roller set 23 still keeps rotating but the rotation thereof can't drive the missing tooth gear 125 anymore, at this time, the idle roller 123 is completely separated from the driving roller 121.

In this embodiment of the present invention, a resist spring 126 is pivotally connected with the missing tooth gear 125 and applies a resist force to ensure the missing tooth gear 125 capable of stopping at the missing-tooth portion 127, and prevent the missing tooth gear 125 from excessively rotating on account of rotating too fast.

The operation flow of doing a single-side scanning by the transmission device 20 in this invention is described as follows.

Referring to FIGS. 8A~11, the paper transmitting path of the automatic document feeder is consisted of an input tray 14, an input path 13, a scanning area 17, an output path 15, and an output tray 16 in sequence from upstream to downstream. A reverse path 18 is connected between the input path 13 and the output path 15.

Figure 8A:
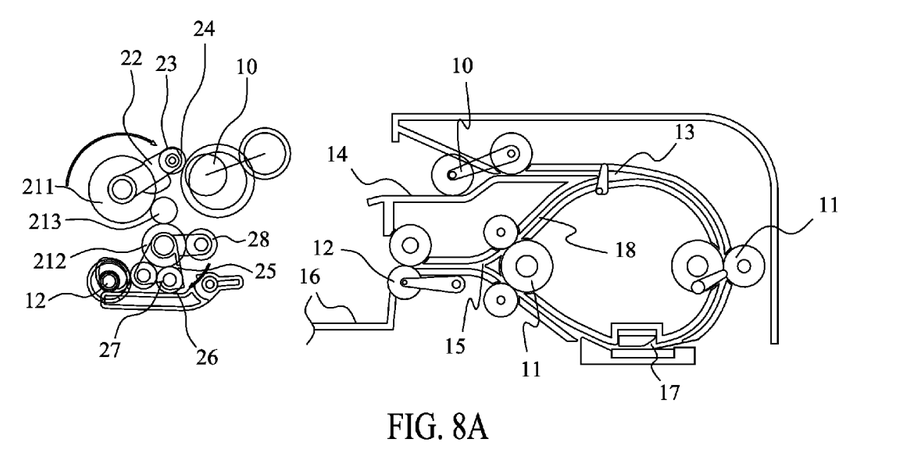

Referring to FIG. 8A, in use, the documents are placed in the input tray 14. The driving motor 19 rotates clockwise to make the first and the second driving gears 211, 212 rotate clockwise, and force the first swing arm 22 swing to the first position and transmit the driving torque to the pickup device 10. The pickup device 10 presses toward the input tray 14 to send the documents into the input path 13. The transmitting speed of the transmitting rollers 11 is faster than the pickup device 10, so the first-fed document sent into the input path 13 won't overlap with the document fed later. And the pickup device 10, the transmitting rollers 11 and the output device 12 are all rotated in the same direction to route the documents through the input path 13, the scanning area 17, the output path 15, and finally into the output tray 16 in sequence.

The operation flow of doing a double-side scanning by the transmission device 20 in this invention is described as follows:

Referring to FIG. 8A, in use, the documents are also placed in the input tray 14. The driving motor 19 rotates clockwise to make the first and the second driving gears 211, 212 rotate clockwise. The first swing arm 22 swings toward the first position and transmit the driving torque to the pickup device 10. Then the pickup device 10 presses toward the input tray 14 to send the documents into the input path 13.

Figure 8B:
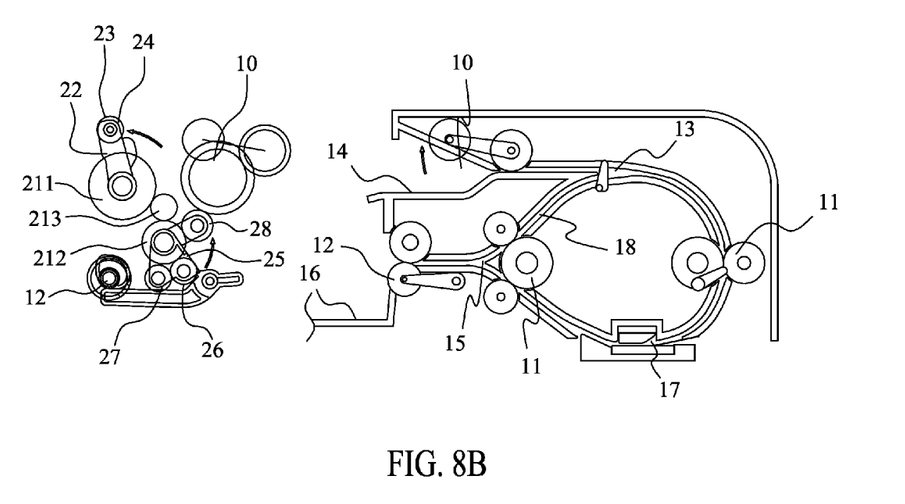

Referring to FIG. 8B, in order to avoid the document passing through the output device 12 to the output tray 16 before the second-side scanning is done, the driving motor 19 will reverse when the document enters the region between the transmitting roller 11 and the scanning area 17. The first and the second driving gears 211, 212 will reverse to rotate counterclockwise by the drive of the driving motor 19, so that makes the first swing arm 22 swing toward the second position, and the second swing arm 25 swing toward the third position. In this case, the transmitting rollers 11 still keep transmitting the documents toward the output device 16 due to the effect of the one-way gear set 30, but the output device will reverse and transmit the documents upstream to avoid the document going into the output tray 16, and the pickup device 10 will also raise by the drive of the second driving roller set 26 to avoid anymore sending documents into the input path 13.

Figure 9A:
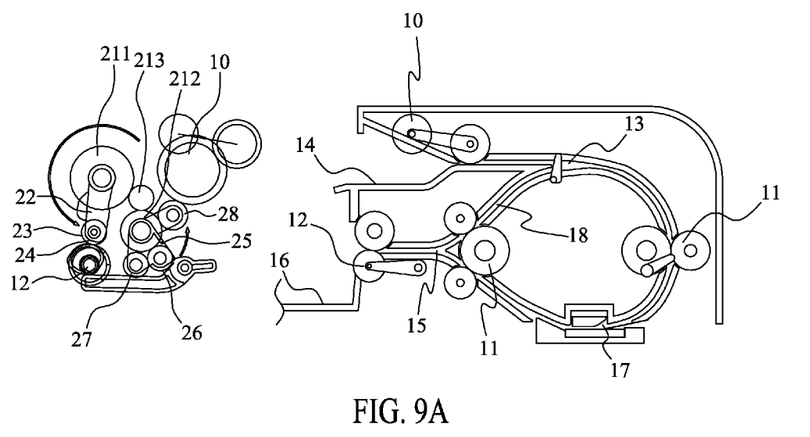
Figure 9B:
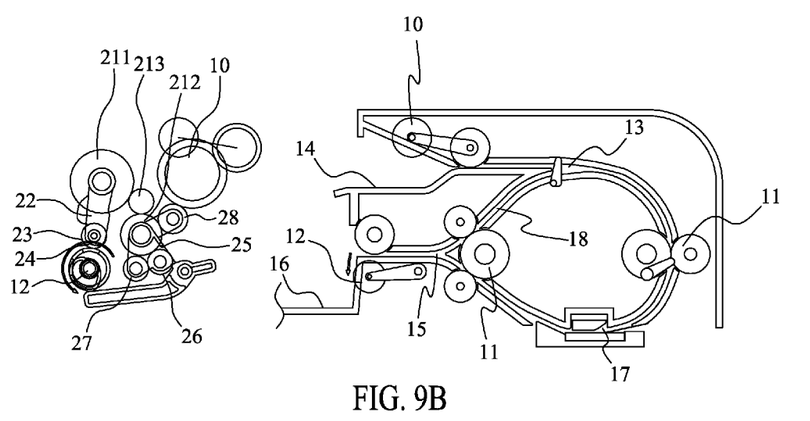
Figure 10A:
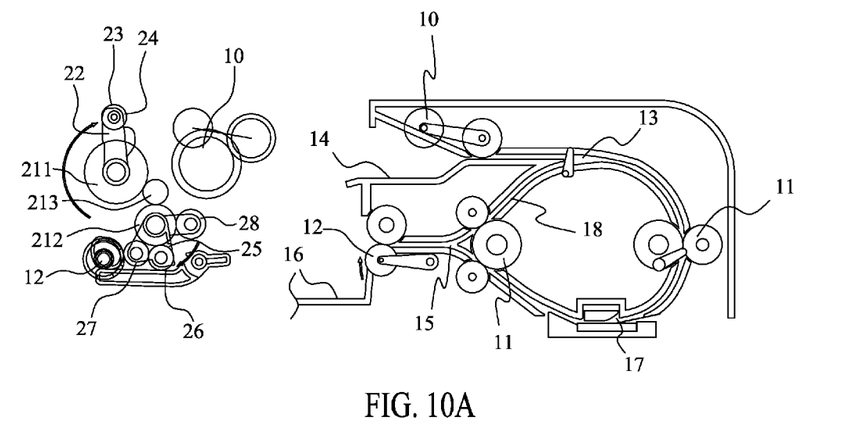
Figure 10B:
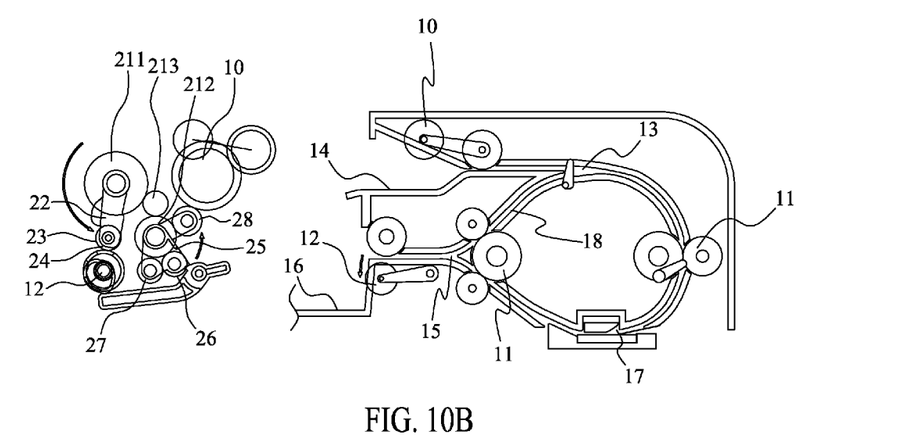
Figure 11:
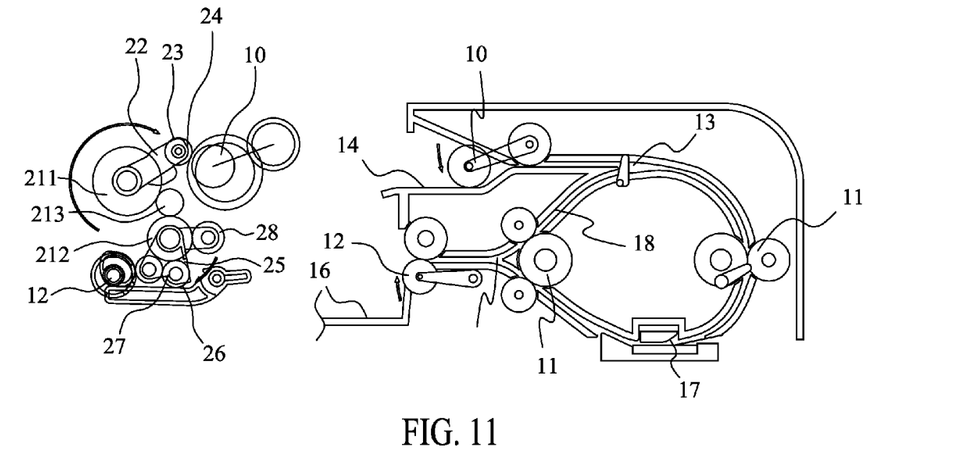

Then, the automatic document feeder needs to turn over the document. In order to do that, the following end of the document has to leave the scanning area 17 completely and then the document is transmitted back into the reverse path 18. Referring to FIG. 9A and FIG. 9B, to make the following end of the document leave the scanning area 17, the leading end of the document has to pass through the output device 12 firstly. But the document-transmitting directions of the output device 12 and the transmitting rollers 11 are exactly opposite when the driving motor 19 rotates in counterclockwise, if the document reaches the output device 12 in this case, the document will be certainly damaged. To avoid the document being damaged, the first driving roller set 23 will mesh with the missing tooth gear 125 of the output device 12 after the first swing arm 22 swings around the second driving gear 212 and forces the idle roller 123 separate from the driving roller 121. Therefore, the scanned document is now capable to pass through the output path 15 and the output device 12 without being hindered. Referring to FIG. 10A and FIG. 10B now, when the following end of the document leaves the scanning area 17 completely, the driving motor 19 changes to rotate clockwise again. The first and the second driving gears 211, 212 now rotate clockwise to drive the second swing arm 25 to swing toward the fourth position so as to make the second driving roller set 26 meshed with the missing tooth gear 125. The idle roller 123 of the output device 12 will raise and contact with the driving roller 121 by the drive of the second driving roller set 26. So the driving roller 121 of the output device 12 and the transmitting rollers 11 all rotate in the direction of transmitting the document toward the output tray 16 till the document enter the output path 15 completely.

In the process of transmitting the document into the output path 15, the first swing arm 22 swings toward the first position but never reaches the pickup device 10. When the document completely enters the output path 15, the driving motor 19 changes to rotate counterclockwise and reverses the driving roller 121 to pull the document back into the reverse path 18. At this time, the first swing arm 22 changes to swing toward the second position. When the document pulled back by the output device 12 passes through the reverse path 18, the first driving roller set 23 is meshed with the missing tooth gear 125.

When the document pulled back by the output device 12 is turned over by passing through the reverse path 18, the idle roller 123 is also separated from the driving roller 121 completely. The document will now enter the scanning area 17 again to make the second-side thereof scanned. And the first swing arm 22 is not in contact with the pickup device 10, so the pickup device 10 could not feed another document anymore.

After both sides of the document are scanned, the processes shown in FIG. 10A and FIG. 10B are repeated again to pull the document back to the reverse path 18 for turning over the document back to the first side. After that, referring to FIG. 11, the driving motor 19 will keep rotating clockwise to transmit the document to the output tray 16, and the pickup device 10 will also press to the document in the input tray 14 for transmitting other documents into the input path 13 again. Then the process shown in FIG. 8A is started over.

In summary, the transmission device 20 in this invention is characterized by using a plurality of swing arms 22, 25, 34 which are driven by the same driving gear set 21 but swing in different directions to transmit the driving torque from the driving motor 19 to the pickup device 10, the output device 12 and the transmitting rollers 11. And it further utilizes the time difference caused by the swinging of the swing arms 22, 25, 34 to control the output time of the driving torque without using any other electronic sensors or controllers. Therefore, when the automatic document feeder uses the transmission device 20 of the present invention therein, it only need use a single driving motor 19 without installing any other additional electronic controllers in the automatic document feeder, so that effectively reduces the volume and production cost of the automatic document feeder.

What is claimed is:

1. A transmission device for an automatic document feeder, the automatic document feeder defining a paper transmitting path, a pickup device, transmitting rollers and an output device being disposed along the paper transmitting path, the transmission device being disposed among the pickup device, the transmitting rollers and the output device for transmitting the driving torque of a driving motor which is located in the automatic document feeder, the transmission device comprising:
    a driving gear set driven by the driving motor and disposed between the pickup device and the output device;
    a first swing arm driven by the driving gear set and equipped with a first driving roller set, the first swing arm being swingable according to the rotating direction of the driving gear set between a first position meshing the first driving roller set with the pickup device to apply the driving torque to the pickup device, and a second position meshing the first driving roller set with the output device to apply the driving torque to the output device;
    a second swing arm driven by the driving gear set and equipped with a second driving roller set, the second swing arm being swingable according to the rotating direction of the driving gear set between a third position meshing the second driving roller set with the pickup device to apply the driving torque to the pickup device, and a fourth position meshing the second driving roller set with the output device to apply the driving torque to the output device; and
    a one-way gear set driven by the driving gear set for applying the driving torque in a constant direction to the transmitting rollers regardless of the rotating direction of the driving gear set;
    wherein when the first swing arm swings toward the first position, the second arm swings toward the fourth position, and when the first swing arm swings toward the second position, the second swing arm swings toward the third position.

2. The transmission device as claimed in claim 1, wherein the driving gear set includes a first driving gear driven by the driving motor, a reverse gear meshed with the first driving gear, and a second driving gear meshed with the reverse gear, the first swing arm is hinged with and driven by the first driving gear, the second swing arm is hinged with and driven by the second driving gear.

3. The transmission device as claimed in claim 2, wherein the first driving roller set includes at least one first actuating gear and a first torque limiter, the first actuating gear is meshed with the first driving gear and hinged on the first swing arm by means of the first torque limiter, the second driving roller set includes at least one second actuating gear and a second torque limiter, the second actuating gear is meshed with the second driving gear and hinged on the second swing arm by means of the second torque limiter.

4. The transmission device as claimed in claim 3, wherein the second swing arm has a first free end and a second free end, the second driving roller set further includes a first reverse gear set, the second actuating gear is hinged on the first free end of the second swing arm, the first reverse gear set is meshed with the second driving gear and hinged on the second free end of the second swing arm, when the second swing arm is located at the third position, the second actuating gear is meshed with the pickup device and transmits the driving torque to the pickup device, when the second swing arm is located at the fourth position, the first reverse gear set is meshed with the output device and transmits the driving torque to the output device.

5. The transmission device as claimed in claim 4, wherein the torque limiters are compression springs, two ends of each of the compression springs abut against the actuating gear and the corresponding swing arm respectively to increase the normal force and friction between the swing arm and the corresponding actuating gear.

6. The transmission device as claimed in claim 1, wherein the one-way gear set includes a third driving gear, a third swing arm, a third actuating gear, a fourth actuating gear, an output gear meshed with the transmitting roller, and a second reverse gear set meshed with the output gear, the third swing arm is hinged with the third driving gear and has a third free end and a fourth free end, the third actuating gear and the fourth actuating gear are both meshed with the third driving gear and are respectively hinged on the third free end and the fourth free end of the third swing arm by means of a third and a fourth torque limiters, the third swing arm is swingable between a fifth position meshing the third driving gear with the output gear by means of the third actuating gear to apply the driving torque to the transmitting rollers, and a sixth position meshing the third driving gear with the output gear by means of the fourth actuating gear and the second reverse gear set to apply the driving torque to the transmitting rollers, so that make the one-way gear set apply the driving torque in a constant direction to the transmitting rollers regardless of the rotation direction of the driving gear set and keep the transmitting rollers rotating in the same direction.

7. The transmission device as claimed in claim 6, wherein the third and the fourth torque limiters are compression springs, and two ends of each of the compression springs abut against the actuating gear and the corresponding free end of the third swing arm to increase the normal force and friction between the third swing arm and the actuating gear.

8. The transmission device as claimed in claim 1, wherein the output device includes a driving roller, an idle roller swing arm disposed opposite to the driving roller, a cam disposed on one side of the idle roller swing arm, a missing tooth gear with a missing-tooth portion coaxially hinged with the cam, and an idle roller hinged with and controlled by the idle roller swing arm, when the first swing arm swings to the second position, the first driving roller set is meshed with the missing tooth gear to drive the output device, when the second swing arm swings to the fourth position, the second driving roller set is meshed with the missing tooth gear to drive the output device, when the missing tooth gear rotates with the meshed driving roller sets, the cam rotates with the missing tooth gear and enforces the idle roller swing arm to swing till the missing-tooth portion contacts with the meshed driving roller sets.

9. The transmission device as claimed in claim 8, wherein a resist spring is coaxially hinged with the missing tooth gear and applies a resist force to ensure the missing tooth gear capable of stopping at the missing-tooth portion.

\* \* \* \* \*